A. WNUCK.
Carriage Brake.
No. 112,665. Patented March 14, 1871.
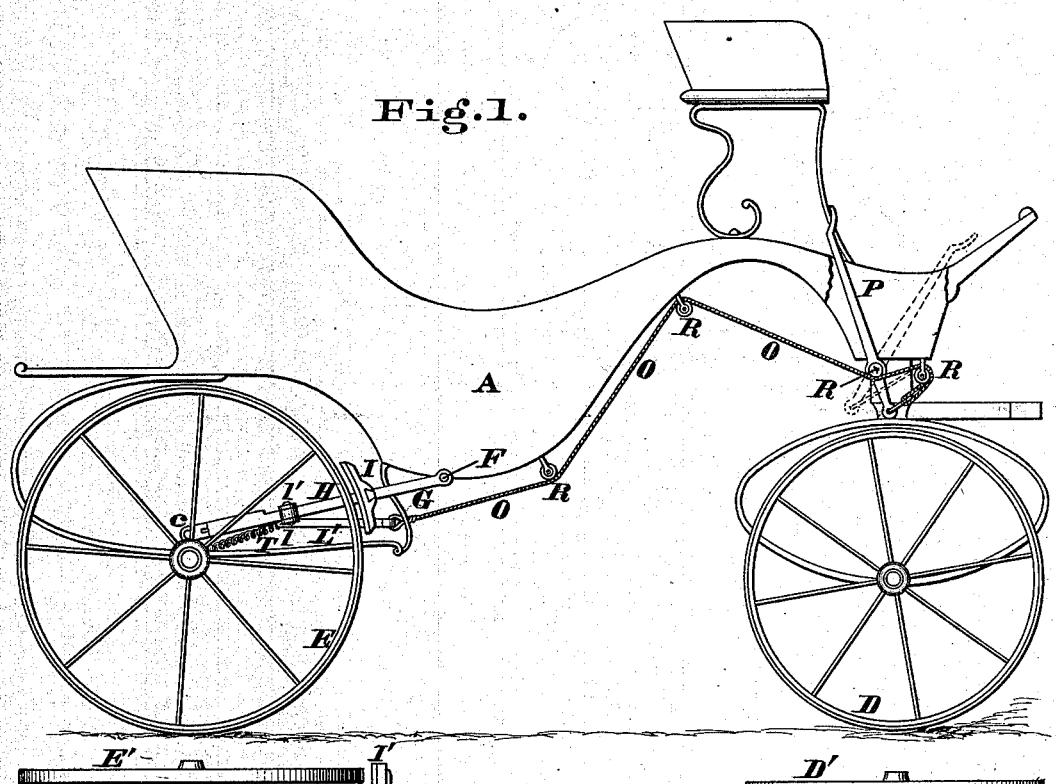
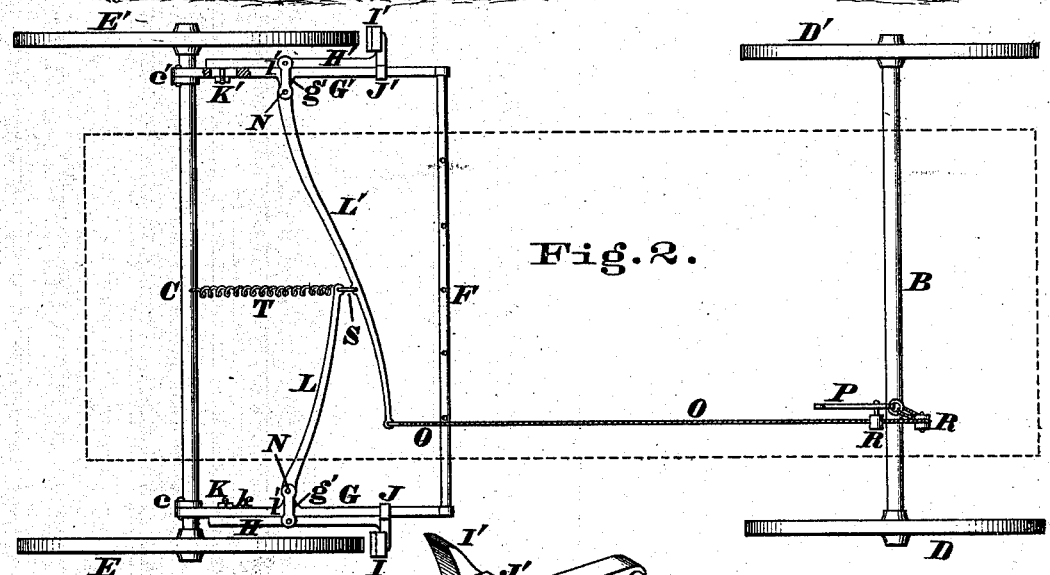
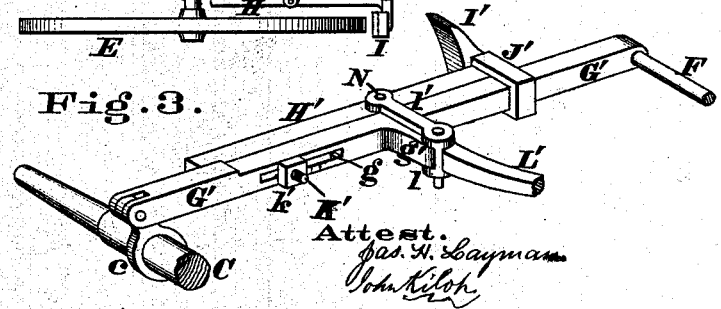

UNITED STATES PATENT OFFICE.

AUGUST WNUCK, OF CINCINNATI, OHIO.

IMPROVEMENT IN CARRIAGE-BRAKES.

Specification forming part of Letters Patent No. 112,665, dated March 14, 1871.

I, AUGUST WNUCK, of Cincinnati, Hamilton county, Ohio, have invented an Improved Carriage-Brake, of which the following is a specification:

Nature and Objects of the Invention.

This invention consists in connecting the rear axle of a carriage to the body by means of a radius-rod, which rod not only maintains the body and axle at a certain fixed distance from one another, but it also serves as a support to the braking mechanism, the principal member of which is a bar having a shoe or rubber at its front end, said bar being adapted to traverse the radius-rod so as to bring the brake into action by means of an arrangement of forked levers, ropes, and pulleys, which will be hereafter fully described.

Description of the Accompanying Drawing.

Figure 1 is a side elevation of a coach provided with my improved brake. Fig. 2 is a plan of the apparatus, the position of the carriage-body being indicated by dotted lines; and Fig. 3 is a perspective view of the braking mechanism on an enlarged scale.

General Description.

A represents the body of a coach, carriage, or other four-wheeled vehicle. B is the front axle. C is the rear axle, and D D' E E' are, respectively, the front and rear wheels of the same.

Firmly attached to the body A, and at a suitable distance in front of the rear axle, C, is a bar, F, to which are secured the forward ends of the radius-rods G G'. The rear ends of these rods are pivoted to clips c c', which are fastened to the axle C.

Placed outside of the radius-rods G G', and parallel therewith, are bars H H', whose forward ends carry the shoes or rubbers I I'. In order to permit of said bars traversing the rods G G', so as to bring the rubbers into action, they are provided with guides J J' and studs K K', which latter occupy slots g in the rods G G'. The studs K K' are furnished with nuts k k'.

Projecting inwardly from the rods G G' are lugs g', which serve as fulcrums for the levers L L', having forked extremities l l', which embrace the bars H H', and are attached thereto by bolts M.

The lever L', which is somewhat longer than the one L, has attached to its free end a rope or light chain, O, which communicates with the brake-lever P, the latter being located in such a position as to be convenient to the driver of the vehicle.

A proper direction is given to the rope O by means of the rollers or pulleys R. The two levers L L' are united by a link, S.

T is a spring, which retracts the levers L L' so as to throw the rubbers out of contact with the peripheries of the wheels E E'.

Operation.

In the normal or non-effective position of the apparatus the rubbers I I' are maintained out of contact with the wheels E E' by the action of the spring T, and whenever it is desired to stop the carriage the driver has only to press his foot against the lever P and force it into the position indicated by dotted lines in Fig. 1, which act brings said rubbers into operation through the medium of rope O, levers L L' l l', and sliding bars H H'. The carriage having been stopped, the moment the driver removes his foot from the lever P the spring T instantly restores the brakes to their non-effective position.

The braking apparatus, being mounted upon the radius-rods G G', can be operated at any moment, as the action of said rods maintains the carriage-body and rear axle at a certain fixed distance apart, and no amount of oscillation can change the relation existing between them.

The bar F can be omitted, and the front ends of the radius-rods can be bolted to the sides of the carriage. The clips c c' can also be dispensed with, and the rear ends of the rods G G' can be arranged so as to embrace the axle C.

Clips or slides may be substituted for bolts k k.

Claim.

I claim as my invention—

In combination, substantially as described, with the sliding bars H H' J J', rubbers I I', levers L L', or their equivalent operating medium O P R, the radius-rods G G', to be hinged or pivoted to the body of the vehicle and to its rear axle, as and for the purpose explained.

In testimony of which invention I hereunto set my hand.

AUGUST WNUCK.

Witnesses:
GEO. H. KNIGHT,
JAMES H. LAYMAN.